(12) United States Patent
Miyamoto et al.

(10) Patent No.: US 8,554,740 B2
(45) Date of Patent: Oct. 8, 2013

(54) RECORDING A LOG OF OPERATIONS

(75) Inventors: Takashi Miyamoto, Chofu (JP);
Kohsuke Okamoto, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 977 days.

(21) Appl. No.: 12/121,835

(22) Filed: May 16, 2008

(65) Prior Publication Data
US 2009/0055443 A1    Feb. 26, 2009

(30) Foreign Application Priority Data
Aug. 23, 2007   (JP) ................................. 2007-217106

(51) Int. Cl.
*G06F 17/00*   (2006.01)

(52) U.S. Cl.
USPC .......................................... 707/672; 715/210

(58) Field of Classification Search
USPC .......................................... 707/672; 715/201
See application file for complete search history.

(56) References Cited

U.S. PATENT DOCUMENTS

| | | | |
|---|---|---|---|
| 7,246,086 B2 * | 7/2007 | Araki et al. .................... 705/1.1 |
| 7,639,387 B2 * | 12/2009 | Hull et al. ..................... 358/1.18 |
| 7,660,798 B1 * | 2/2010 | Ludwig et al. .................. 726/11 |
| 2002/0032787 A1 * | 3/2002 | Overton et al. ................ 709/230 |
| 2005/0058319 A1 * | 3/2005 | Rhoads et al. ................. 382/100 |
| 2005/0138111 A1 * | 6/2005 | Aton et al. ..................... 709/201 |
| 2005/0198300 A1 * | 9/2005 | Gong et al. .................... 709/227 |
| 2005/0251749 A1 * | 11/2005 | Lamkin et al. ................. 715/719 |
| 2005/0289231 A1 | 12/2005 | Harada et al. |
| 2006/0026100 A1 * | 2/2006 | Bender et al. .................... 705/44 |
| 2006/0149771 A1 | 7/2006 | Kojima et al. |
| 2008/0120129 A1 * | 5/2008 | Seubert et al. .................... 705/1 |
| 2008/0243753 A1 * | 10/2008 | Gormish et al. ................ 707/707 |
| 2009/0055443 A1 * | 2/2009 | Miyamoto et al. ............. 707/202 |
| 2009/0100129 A1 * | 4/2009 | Vigil et al. ..................... 709/203 |
| 2011/0082760 A1 * | 4/2011 | Kaye ............................ 705/26.1 |
| 2011/0099108 A1 * | 4/2011 | Fung et al. ...................... 705/44 |

FOREIGN PATENT DOCUMENTS

| | | |
|---|---|---|
| JP | 10222450 A | 8/1998 |
| JP | 2000 076266 | 3/2000 |
| JP | 2001154987 A | 6/2001 |
| JP | 2001318809 A | 11/2001 |

(Continued)

OTHER PUBLICATIONS

Office Action mailed Oct. 11, 2011, Japan Patent Office, Application No. 2007-217106.

(Continued)

*Primary Examiner* — Robert Beausoliel, Jr.
*Assistant Examiner* — Alexandria Bromell
(74) *Attorney, Agent, or Firm* — Toler Law Group, P.C.

(57) ABSTRACT

Systems and methods are provided that record an easily viewable log of operations. A particular system includes a response receiving unit that receives an input response from a server, the input response related to a first client request and including first content adapted to prompt data input via a client. Additionally, the system includes a response sending unit that sends the client an output response, including the first content and an identifier to identify the first content and a logging database to record the first content in association with the identifier. Further, the system includes a request receiving unit that receives a second client request including input data related to the first content and the identifier and a content combining unit that combines the input data extracted from the second client request with the first content that is retrieved from the logging database based on the identifier.

20 Claims, 7 Drawing Sheets

(56) References Cited

FOREIGN PATENT DOCUMENTS

| | | |
|---|---|---|
| JP | 2001350652 A | 12/2001 |
| JP | 2003141075 A | 5/2003 |
| JP | 2005078329 A | 3/2005 |
| JP | 2006011683 A | 1/2006 |
| JP | 2006190033 A | 7/2006 |
| JP | 2007065718 A | 3/2007 |
| JP | 2007086932 A | 4/2007 |
| WO | WO2007034585 * | 3/2007 ............ G06F 13/00 |

OTHER PUBLICATIONS

English Language Translation of JP2000076266 (Abstract Only) [1 pg].

* cited by examiner

RECORDING A LOG OF OPERATIONS

TECHNICAL FIELD

Embodiments of the present invention generally relate to logging, and in particular, relate to a technique for recording a log of operations that is easily viewable.

BACKGROUND

Recently, laws for stopping, for example, repeated accounting irregularities and lack of compliance with applicable regulations have been developed. As a result, it is necessary to record a log of operations of, for example, Web applications for, e.g., audits. It is necessary to log all transactions (often across a plurality of Web applications) related to a certain deal for, e.g., audits. Moreover, it is preferable that a log of operations be presented in a form that is easily viewable by humans.

Devices that record all IP packets are available as a technique for recording all communications in Web applications. However, such devices do not record all communication data but only IP packet level data. Thus, the data is not easy for humans to understand as is, and it is difficult to rapidly provide information necessary for, e.g., audits.

Moreover, for example, there is a product that provides a function of recording an input screen image of an HTML form when an application is made in a client at the application framework level, such as IBM (a registered trademark) Form-Wave (a registered trademark). Such an input screen image is information that is easy for humans to understand. However, in such a product, cooperation in logging cannot be performed across application frameworks.

SUMMARY

Accordingly, embodiments of the present invention provide a logging system, a method, and a computer program for recording an easily viewable log of operations in processing between clients and servers. In detail, embodiments of the present invention implement logging not on the side of clients (browsers) but between the clients and servers so as to fit to audits and provide a logging system, a method, and a computer program in which existing applications need not be rewritten. Moreover, embodiments of the present invention provide a logging system, a method, and a computer program in which uniform logging can be performed even in an environment in which a plurality of servers and a plurality of applications exist.

In order to solve the aforementioned problems, a particular embodiment of the present invention provides a system that includes a response receiving unit to receive an input response sent from a server. The input response is related to a first client request, the input response includes first content corresponding to the first client request, and the first content is adapted to prompt data input via a client. The system also includes an identifier embedding unit to generate an identifier and embed the identifier in the first content, where the identifier identifies the first content, and a response sending unit to send an output response to the client. The output response includes at least the first content and the identifier. Additionally, the system includes a logging database to record the first content in association with the identifier, and a request receiving unit to receive a second client request from the client. The second client request corresponds to the output response and the second client request includes input data related to the first content and includes the identifier. Further, the system includes a content combining unit to extract the input data and the identifier, retrieve the first content from the logging database based on the extracted identifier, combine the extracted input data with the retrieved first content to produce resulting data, and record the resulting data in the logging database.

The system may further include a response analyzing unit that analyzes the input response received from the server and determines whether to record a log of an operation. In this arrangement, the system can select objects to be logged.

The system may further include an illegal request processing unit that determines when the second client request is an illegal request and performs predetermined processing when the identifier extracted from the second client request is not found in the logging database. In this arrangement, the system can find illegal requests and perform appropriate processing.

One or some of a session ID, a client IP address, a user ID having been identified, and a URL corresponding to a send button may be additionally recorded in the logging database in association with the first content, and the system may further include an illegal request processing unit that determines that the second request is an illegal request and performs predetermined processing when these items of information do not correspond to those in the second request received from the client. In this arrangement, stricter check can be performed, and thus a highly reliable system can be provided.

The identifier is preferably recorded in the logging database in association with the order in which the identifier was generated so as to track the order in which content was used.

While the outline of embodiments of the present invention has been described as a system, embodiments of the present invention can also be viewed as a method or a computer program (or a program product). The program product includes, for example, a storage medium in which the aforementioned program is stored in a memory device.

It should be noted that the aforementioned outline of embodiments of the invention does not include all necessary features of embodiments of the present invention, and a combination or a sub-combination of these components may also constitute embodiments of the invention.

DETAILED DESCRIPTION

Embodiments of the present invention will now be described in detail on the basis of the drawings. The following embodiments do not restrict the claims. Moreover, all combinations of features described in the embodiments are not necessarily mandatory.

Moreover, the embodiments of the present invention may be implemented in various different embodiments and should not be construed as being limited to the description of the embodiments. The same numbers are assigned to the same components throughout the description of the embodiments.

Figure 1:
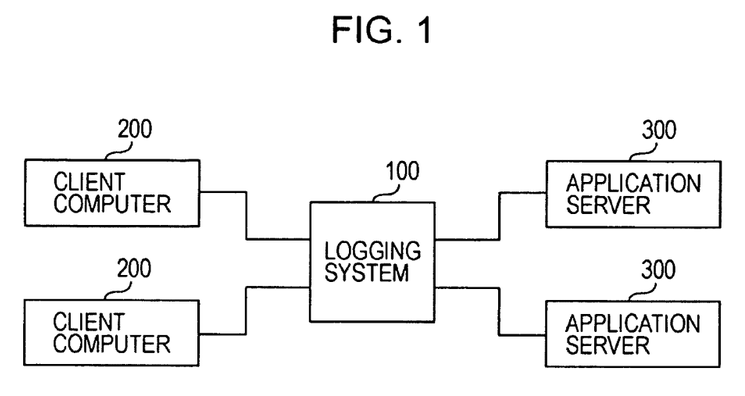
FIG. 1 shows an example of the outline of a logging system according to an embodiment of the present invention.

FIG. 1 shows an example of the outline of a logging system according to an embodiment of the present invention. A logging system 100 is connected to one or more client computers 200 and one or more application servers 300. The logging system 100 is disposed between the clients 200 and the application servers 300. For example, the logging system 100 may be disposed in an authentication server, between an authentication server and the application servers 300, as servlets in the application servers 300, or as a plug-in of a Web server located between the clients 200 and the application servers 300.

Figure 2:
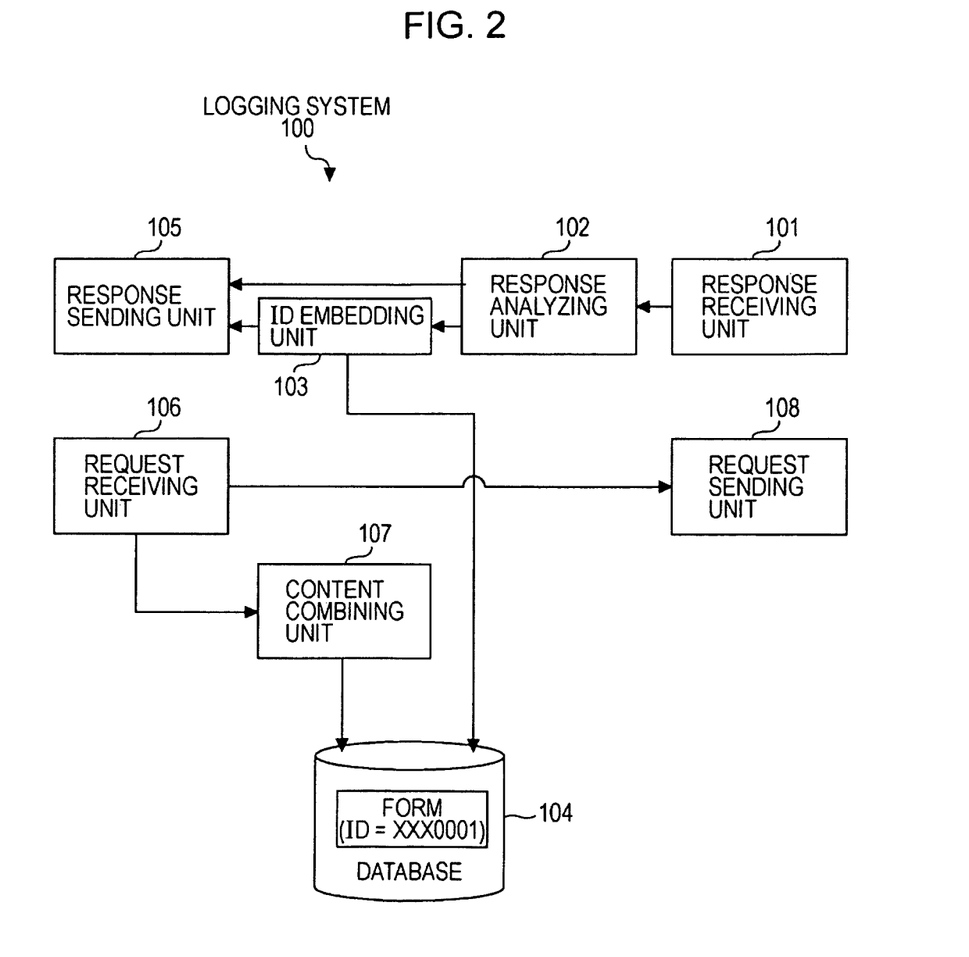
FIG. 2 shows a logging system 100 according to an embodiment of the present invention, the logging system 100 divided into functional blocks.

FIG. 2 shows the logging system 100 according to an embodiment of the present invention, the logging system 100 divided into functional blocks. Components shown in the functional block diagram in FIG. 2 can be implemented by, in the information processing unit having the hardware configuration illustrated in FIG. 7, loading an operating system, computer programs, and the like stored in, for example, a hard disk drive into a main memory, causing a CPU to read the operating system, the computer programs, and the like, and causing hardware resources and software to cooperate with each other.

The logging system 100 includes a response receiving unit 101, a response analyzing unit 102, an ID embedding unit 103, a logging database 104, a response sending unit 105, a request receiving unit 106, a content combining unit 107, and a request sending unit 108.

The response receiving unit 101 receives an HTML file sent as an HTTP response by a first one of the application servers 300 in response to an HTTP request from a first one of the clients (browsers) 200. In the following description, it is assumed that HTML files also include XHTML files.

For the purpose of, for example, audits, in particular, it is more important to record a log of operations in a form application in which input by users is expected than in a reference application (for example, a Web site that includes only static HTML). Thus, in a preferred embodiment of the present invention, the logging system 100 selects a form application and performs logging. Thus, the logging system 100 includes the response analyzing unit 102, which analyzes the received HTTP response and determines whether to record an operation log.

Figure 3:
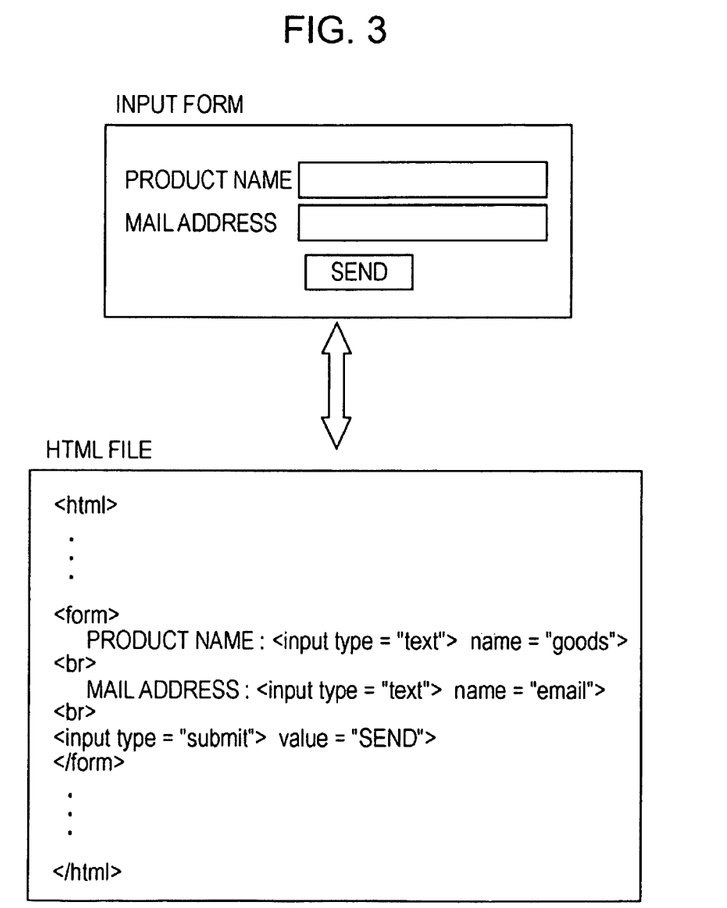
FIG. 3 shows specific examples of an input form and a corresponding HTML file.

FIG. 3 shows specific examples of an input form that is content to be logged and a corresponding HTML file in a preferred embodiment of the present invention. In this HTML file, a section enclosed in form tags, i.e., <form> and </form>, represents the input form. The response analyzing unit 102 can determine, by checking whether an HTML file received as an HTTP response includes form tags, whether the HTTP response includes an input form.

Moreover, an object to be logged can be selected on the basis of criteria other than information on whether an input form is included. For example, when an HTTP response includes a specific URL or a specific HTTP request parameter, when an HTTP response includes a specific character string, or when an HTTP response is addressed to a specific user, logging may be performed. In such cases, the response analyzing unit 102 determines, by checking whether the HTTP response meets a predetermined condition, whether the HTTP response is to be logged.

The ID embedding unit 103 embeds, in an input form, an identifier (hereinafter called a form ID) for identifying the input form. A form ID is used to track an input form, i.e., to relate the input form sent via a corresponding HTTP response to data that is subsequently input to the input form by a user. The details will be described in relation to the content combining unit 107 described below.

A form ID is preferably unique and hard to predict and may be generated from, for example, a character string that includes one or a combination of some of a fixed character string, a random number character string, a user ID, a time, a URL, a content name, and a parameter name, a character string obtained by hashing or encrypting them, or a combination of them. This is because, when it is easy to predict the value of a form ID, a problem exists in that an arrangement can be made by changing the form ID, in which input to a form by one person is confused with input to a form by another person.

Figure 4:
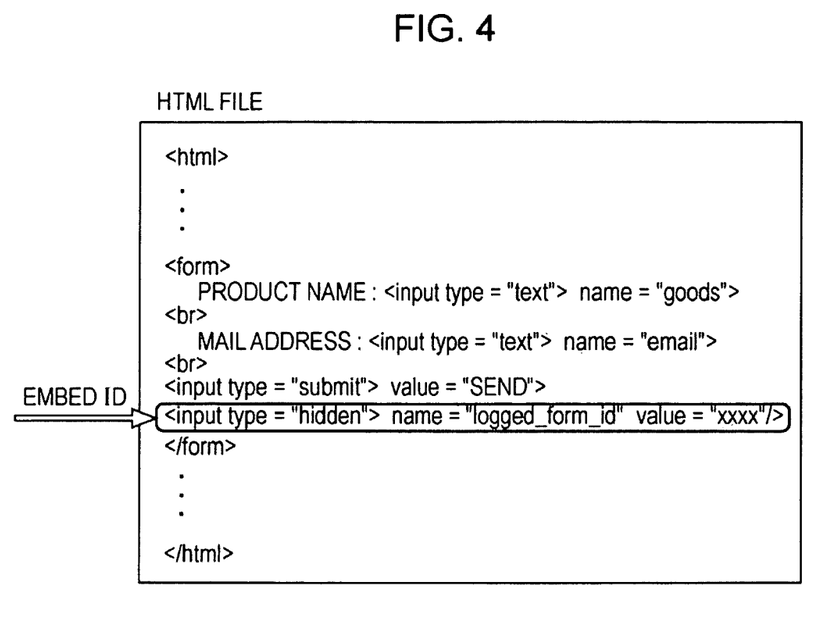
FIG. 4 shows the content of an HTML file in which an ID for identifying an HTTP response in an embodiment of the present invention.

In a preferable embodiment of the present invention, a form ID is embedded in an input form using a hidden field. FIG. 4 shows the content of an HTML file obtained by embedding this ID in the HTML file described in FIG. 3. The ID embedding unit 103 adds a hidden field, for example, <input type="hidden"> name="logger_form_id" value="xxxx"/>, between form tags in the received HTML file (a section "xxxx" indicates a form ID). In this arrangement, a corresponding input form can be tracked. As the method for tracing an input form, other than a method in which a hidden field is used, a method for tracing an input form using one or a combination of a session ID, a cookie, an IP address, an authentication ticket, a URL, a time, and the like may be adopted.

A form ID can be used to track not only a form but also a series of user transactions. In this case, the ID embedding unit 103 performs control so that the sequence of generated form IDs can be tracked. For example, a sequence number may be included in a form ID, and the sequence number may be incremented every time an HTTP response is received from the application servers 300. However, in a preferred embodiment of the present invention, form IDs are recorded in a database in association with the order in which the form IDs were generated, for example, the form IDs are stored in a predetermined storage area in the order in which the form IDs were generated, so as not to include values easy to predict in the form IDs. In this arrangement, a chain of forms can be tracked in the logging system 100. Moreover, when an HTTP response that does not include any form also needs to be tracked, the ID embedding unit 103 may newly generate a form that includes only a hidden field, and embed a form ID in the form. In known logging in a framework operating in each application server, only tracking of a chain in each framework can be performed. In the logging system 100 according to an embodiment of the present invention, a chain across a plurality of the application servers 300 or a plurality of frameworks can also be tracked.

In the logging database 104, input forms and form IDs are recorded in association with each other. In a preferred embodiment of the present invention, a form ID is embedded in a corresponding input form. Moreover, in the logging database 104, in addition to a form ID, for example, a session ID, a client IP address, a user ID having been identified, and a URL corresponding to a send button may be recorded in association with an input form. For example, even in a case where a form ID is forged or a case where a form ID is stolen during communication and used to send another form, stricter check can be performed by using these items of information in addition for identity check. Thus, a highly reliable system can be provided.

The response sending unit 105 sends an input form in which a form ID is embedded to the first one of the clients 200 as an HTTP response. The sent input form is displayed on a display unit 11 in the first one of the clients 200. When a user has performed transmission after inputting necessary data in the form, an HTTP request that includes the input data and the form ID embedded in the input form is sent from the first one of the clients 200 to the first one of the application servers 300. The request receiving unit 106 receives the HTTP request. The request sending unit 108 sends the first one of the application servers 300 the HTTP request as is (without, for example, a change).

The content combining unit 107 analyzes the HTTP request received from the first one of the clients 200 and retrieves the form ID, i.e., the value of logger_form_id. Then, the content combining unit 107 searches the logging database 104 to retrieve an input form that includes the same form ID as this form ID.

When the same form ID does not exist in the logging database 104, it can be determined that the request is an illegal request for which no corresponding input form exists. In this case, the logging system 100 can cause an illegal request processing unit (not shown) to perform processing, such as resending the input form to the first one of the clients 200, recording the error, and sending a notification to an operator. Moreover, when a session ID, a client IP address, a user ID having been identified, and a URL corresponding to the send button recorded in the logging database 104 in association with the input form do not correspond to the request received from the first one of the clients 200, it is determined that the request is an illegal request, so that predetermined processing for an illegal request can be performed.

The content combining unit 107 further extracts the data input by the user from the HTTP request received from the first one of the clients 200 and rewrites the HTML so as to embed the input data in a predetermined position in the input form, which is retrieved from the logging database 104. Specifically, the input data is embedded as an initial value of an input tag in the input form. Moreover, when the original HTML file includes images or other types of static content, such as buttons or banners, the content combining unit 107 generates an image in which these pieces of content are embedded. The logging system 100 may perform supplementation by caching these pieces of content, or supplementation may be performed by sending an HTTP request to the first one of the application servers 300 and obtaining these pieces of content. As a result, a form in which input data is completed is generated.

The content combining unit 107 records the generated form in the logging database 104. An easily viewable log of operations can be kept by recording, in the logging database 104, the form, in which data has been input, generated by combining the input form received from the first one of the application servers 300 with the input data received from the first one of the clients 200 in this manner. In the logging database 104, other than forms in which data has been input, client information, such as IP addresses, user IDs having been authenticated, and dates and times, may be additionally recorded. Moreover, admissibility can be improved by adding a signature to, for example, a form to be recorded in an electronic signature server and recording a signature value in addition. The recording format of the logging database 104 may be a format other than HTML, such as the PDF format, that is generated by performing rendering of HTML. Moreover, various types of information, for example, places where forms in which data has been input are stored (key values in a case where the forms are stored in a relational database (RDB)), the aforementioned client information, times, and information on the result of determining whether requests are legal or illegal, may be simultaneously output to an ordinary log in a common log format that is not a visual log in, for example, syslog that is a standard logging system in Unix (a registered trademark) or Linux (a registered trademark). It will be obvious to persons skilled in the art that various types of method for storing data in the logging database 104 may be considered. For example, data may be simply written to a file system or may be stored in a relational database so that the data can be retrieved using, for example, times when forms were sent and user IDs as keys.

Figure 5:
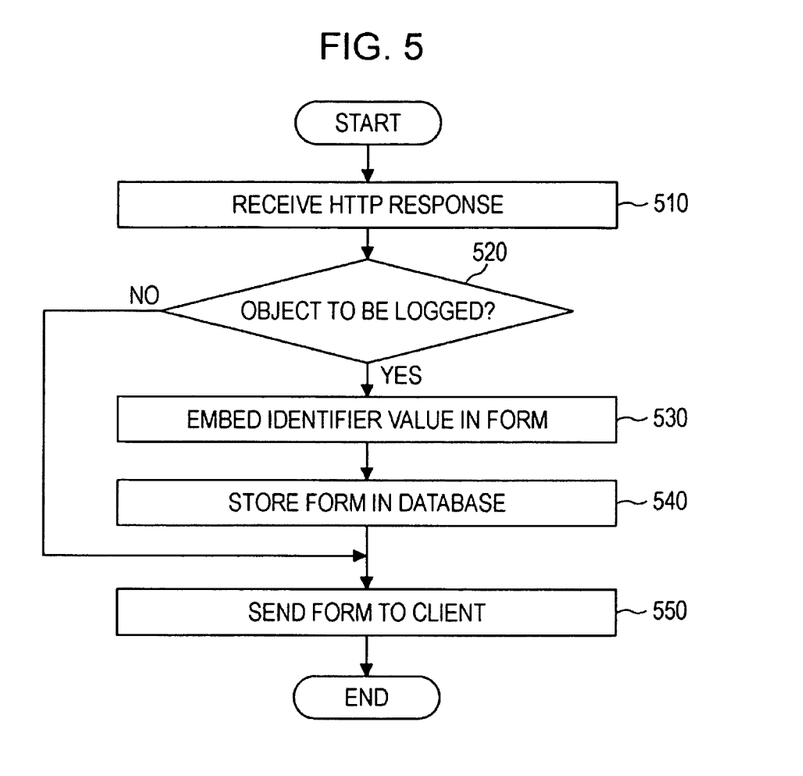
FIG. 5 is a flowchart showing a process in the logging system 100 in a case where the logging system 100 receives an HTTP response from an application server in an embodiment of the present invention.

FIG. 5 is a flowchart showing a process in the logging system 100 in a case where the logging system 100 according to an embodiment of the present invention receives an HTTP response sent from a second one of the application servers 300 to a second one of the clients 200. The process started from step 510 where the response receiving unit 101 receives the HTTP response sent from the second one of the application servers 300 to the second one of the clients 200 in response to an HTTP request from the second one of the clients 200.

In step 520, the response analyzing unit 102 determines whether the received HTTP response is an object to be logged. For example, when an HTTP response that includes an input form for prompting user input is to be logged, the response analyzing unit 102 analyzes an HTML file sent as the HTTP response and checks whether form tags are included. When no input form is included, i.e., when the HTTP response is not an object to be logged (NO in step 520), the process proceeds to step 550 where the received HTTP response is sent to the second one of the clients 200 as is, and then the process is completed. On the other hand, when an input form is included and thus the HTTP response is an object to be logged (YES in step 520), the process proceeds to step 530.

In step 530, the ID embedding unit 103 generates a form ID and embeds the form ID in the input form. In step 540, the form, in which the form ID has been embedded, is recorded in the logging database 104. Then, in step 550, the form is sent to the second one of the clients 200 by the response sending unit 105.

Figure 6:
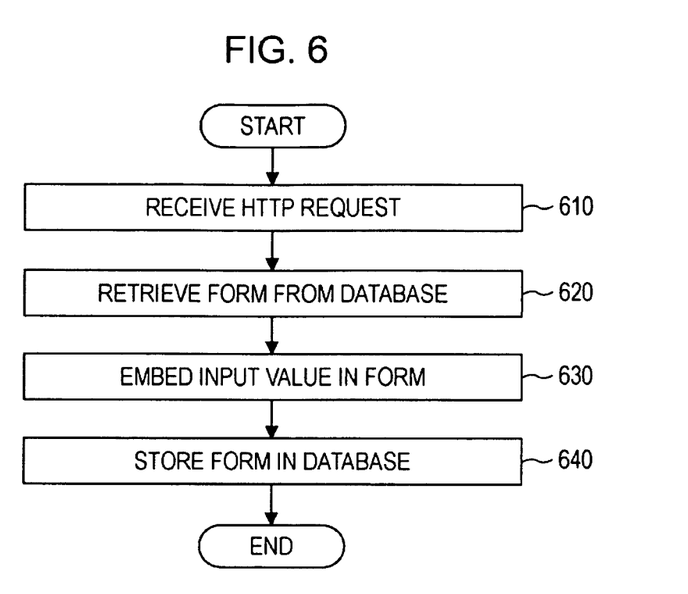
FIG. 6 is a flowchart showing a process in the logging system 100 in a case where the logging system 100 receives an HTTP request from one of clients 200 in an embodiment of the present invention.

FIG. 6 is a flowchart showing a process in the logging system 100 in a case where the logging system 100 according to an embodiment of the present invention receives an HTTP request sent from the second one of the clients 200 to the second one of the application servers 300. The process is started from step 610 where the request receiving unit 106 receives the HTTP request sent from the second one of the clients 200 to the second one of the application servers 300 in response to the HTTP response from the second one of the application servers 300. The received HTTP request includes data input to the form by the user and the form ID included in the HTTP response.

In step 620, the content combining unit 107 extracts the form ID from the received HTTP request and then retrieves a form that includes the same form ID as this form ID from the logging database 104. When the same form ID is not found in the logging database 104, the ID may have been changed. Thus, the logging system 100 may determine the HTTP request as illegal and perform predetermined processing.

In step 630, the content combining unit 107 extracts the data input by the user from the received HTTP request and then rewrites the HTML file so as to embed the data in a predetermined position in the input form, which is retrieved from the logging database 104 using the form ID extracted from the HTTP request. Then, in step 640, the form, in which the input data is embedded, is recorded in the logging database 104. Then, the request sending unit 108 sends the second one of the application servers 300 the HTTP request received from the second one of the clients 200 as is (without, for example, a change).

Figure 7:
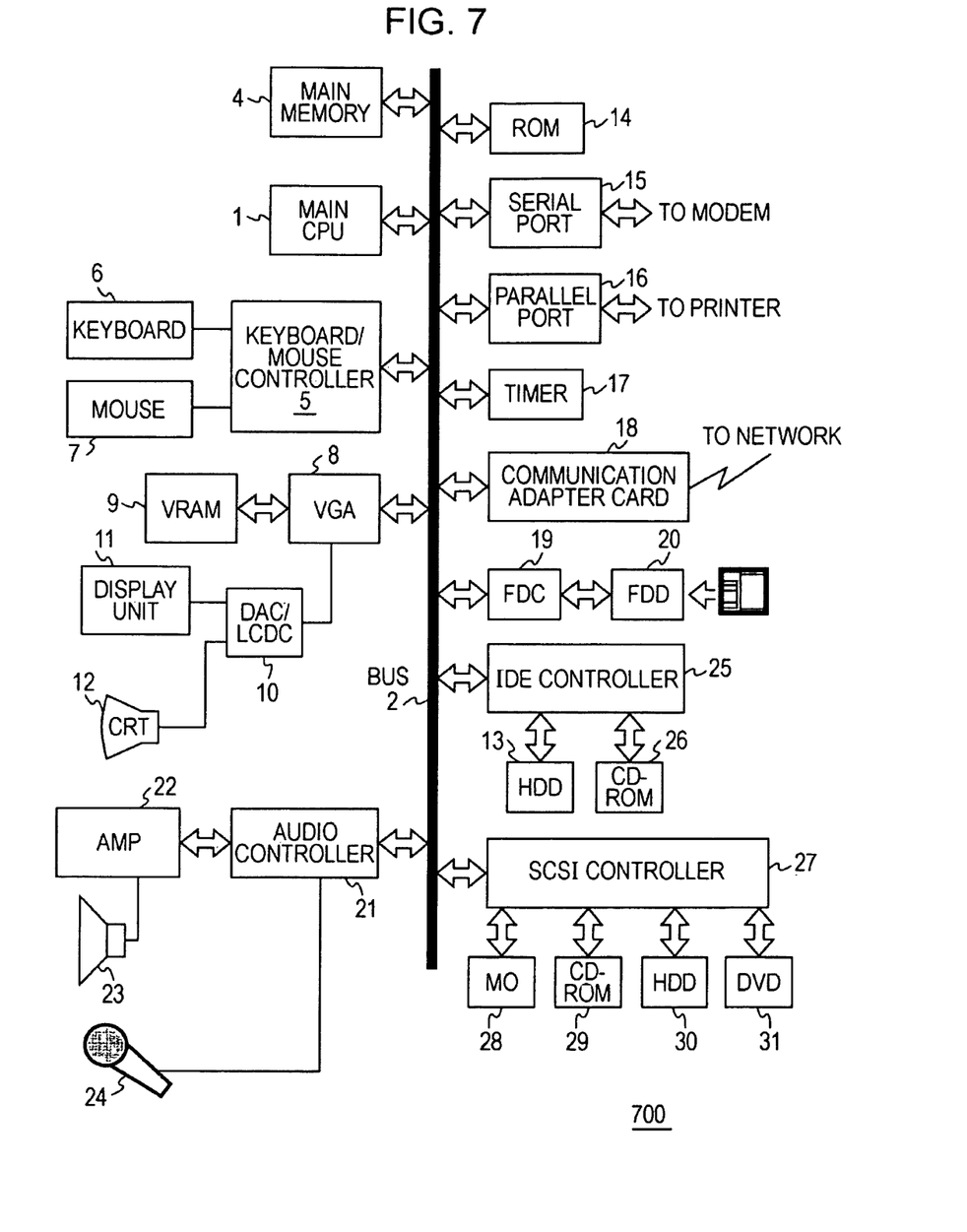
FIG. 7 shows an example of the hardware configuration of an information processing unit 700 suitable for implementing a computer in which the logging system 100 operates, the client computers 200, and the application servers 300 in an embodiment of the present invention.

FIG. 7 shows an example of the hardware configuration of an information processing unit 700 suitable for implementing a computer in which the logging system 100 operates, the client computers 200, and the application servers 300 in an embodiment of the present invention. The information processing unit includes a central processing unit (CPU) 1 and a main memory 4. The CPU 1 and the main memory 4 are connected to a hard disk drive 13 functioning as an auxiliary storage device via a bus 2. Moreover, removable storages (external storage systems in which recording media are interchangeable), such as a flexible disk drive 20, an MO drive 28, and CD-ROM drives 26 and 29, are connected to the bus 2 via a flexible disk controller 19, an IDE controller 25, and/or an SCSI controller 27 associated with the removable storages.

Storage media, such a flexible disk, an MO, and a CD-ROM, are inserted into the removable storages, such as the flexible disk drive 20, the MO drive 28, and the CD-ROM drives 26 and 29, respectively. The code of a computer program for implementing embodiments of the present invention can be recorded in the flexible disk and the like, the hard disk drive 13, and a ROM 14 by issuing instructions to the CPU and the like in cooperation with an operating system. The computer program is executed by being loaded into the main memory 4. The computer program may be compressed, or divided into a plurality of pieces to be recorded in a plurality of media.

The information processing unit may further include a pointing device 7 such as a mouse, a keyboard 6, and a display 12 for presenting visual data to users as user interface hardware. Moreover, the information processing unit may be connected to a printer (not shown) via a parallel port 16 and a modem (not shown) via a serial port 15. The information processing unit 700 can connect to a network via, for example, the serial port 15 and the modem or a communication adapter 18 (for example, an Ethernet (a registered trademark) card or a Token Ring card) and communicate with another computer and the like.

It will be easily understood on the basis of the foregoing description that the information processing unit according to an embodiment of the present invention is implemented via an information processing unit, such as a mainframe, a workstation, or an ordinary personal computer (PC), or the combination of these components. However, these components are illustrative, and all the components are not components mandatory for embodiments of the present invention.

Persons skilled in the art can easily presume various modifications in which, for example, the individual hardware components in the information processing unit used to carry out embodiments of the present invention are implemented by combining a plurality of machines and allocating functions to the machines. These modifications represent concepts that are justifiably included in an idea of embodiments of the present invention.

In a computer in which the logging system 100 operates, the client computers 200, and the application servers 300 in an embodiment of the present invention, an operating system that supports a GUI multiwindow environment may be adopted, such as a Windows (a registered trademark) operating system provided by Microsoft Corporation, AIX (a registered trademark) or z/OS (a registered trademark) provided by International Business Machines Corporation, Mac OS provided by Apple Computer, Inc., or Linux (a registered trademark).

Alternatively, in a computer in which the logging system 100 operates, the client computers 200, and the application servers 300, an operating system that supports a character-based environment may be adopted, such as PC-DOS provided by International Business Machines Corporation or MS-DOS provided by Microsoft Corporation. Alternatively yet, in a computer in which the logging system 100 operates, the client computers 200, and the application servers 300 in an embodiment of the present invention, a real-time OS, such as OS/Open provided by International Business Machines Corporation or VxWorks provided by Wind River Systems, Inc., or an operating system incorporated in a network computer, such as Java (a registered trademark) OS, may be adopted.

Thus, it can be understood that a computer in which the logging system 100 operates, the client computers 200, and the application servers 300 in an embodiment of the present invention are not limited to a specific operating system environment. Needless to say, a computer in which the logging system 100 operates, the client computers 200, and the application servers 300 may operate in different operating system environments.

According to embodiments of the present invention, an image of a form in which data input by a user is embedded can be recorded in the logging database 104, and thus a log of operations that is easily viewable can be provided. Moreover, because the logging system 100 is provided between the clients 200 and the application servers, there is no dependency on an application framework. Moreover, even in an environment in which a plurality of servers and a plurality of applications exist, uniform logging can be performed.

Embodiments of the present invention can be implemented as hardware, software, or a combination of hardware and software. Typical execution using a combination of hardware and software includes execution in a data processing system that includes a predetermined program. In this case, the predetermined program controls the data processing system and is caused to execute processes according to embodiments of the present invention by being loaded into the data processing system and executed. The program includes a group of instructions that can be expressed in a predetermined language, code, and notation. Such a group of instructions enable the system to perform predetermined functions directly or after performing one or both of, one, conversion to another language, code, and notation and, two, copying to another medium.

Needless to say, the scope of embodiments of the present invention includes not only such a program but also a medium in which the program is recorded. The program for executing functions of embodiments of the present invention may be stored in any computer-readable recording medium, for example, a flexible disk, an MO, a CD-ROM, a DVD, a hard disk drive, a ROM, an MRAM, or a RAM. In order to store the program in a recording medium, the program can be downloaded from another data processing system connection to which is established via a communication line or copied from another recording medium. Moreover, the program can be compressed, or divided into a plurality of pieces to be stored in one or more recording media. Moreover, note that program products for implementing embodiments of the present invention can be provided in various forms.

While the embodiments according to the present invention have been described, the technical scope of the embodiments of the present invention is not limited to that described in the aforementioned embodiments. It is obvious to persons skilled in the art that various changes or improvements can be made in the aforementioned embodiments. Thus, needless to say, the embodiments, in which such changes or improvements are made, are included in the technical scope of embodiments of the present invention.

What is claimed is:

1. A system comprising:
   a processor;
   a response receiving unit executable by the processor to receive an input response from a server, the input response including first content corresponding to a first client request, the first content adapted to prompt data input via a client, wherein the first content includes a hypertext markup language (HTML) file;
   an identifier embedding unit executable by the processor to generate an identifier and to embed the identifier in the first content, wherein the identifier is to identify the first content;
   a response sending unit executable by the processor to send an output response to the client, wherein the output response includes at least the first content and the identifier of the first content;
   a logging database to store both the HTML file and the identifier of the first content in response to determining that the HTML file includes an input form;
   a request receiving unit executable by the processor to receive a second client request from the client, the second client request corresponding to the output response, the second client request including input data related to the first content and the second client request including the identifier of the first content; and
   a content combining unit executable by the processor to:
      extract the input data and the identifier of the first content from the second client request;
      retrieve the first content from the logging database based on the extracted identifier of the first content, wherein the extracted identifier of the first content is found in the logging database;
      combine the extracted input data with the retrieved first content to produce resulting data, wherein the resulting data is produced by modifying the HTML file to include the input data at a predetermined position of the input form;
      generate an image of the input form based on the resulting data, the image including the input form and the input data; and
      record the resulting data in the logging database.

2. The system of claim 1, further comprising a response analyzing unit to analyze the input response and to determine whether to record at least a portion of the input response in the logging database.

3. The system of claim 2, wherein determining that the HTML file includes the input form comprises:
   determining whether the HTML file includes one or more form tags; and
   determining that the HTML file includes the input form in response to determining that the HTML file includes the one or more form tags.

4. The system of claim 1, wherein the first client request is sent from the client to the server and the second client request is sent from the client to a second server.

5. The system of claim 1, further comprising a request sending unit that sends the second client request, without modification, to the server.

6. The system of claim 1, wherein the identifier embedding unit generates a form when an additional input response does not include specified content, the form including a hidden field embedded with an additional identifier.

7. The system of claim 1, further comprising an illegal request processing unit to determine that the second client request is an illegal request when the identifier extracted from the second client request does not identify the first content and is not found in the logging database.

8. The system of claim 1, wherein one or more additional items including a session identifier (ID), a client Internet Protocol (IP) address, a user ID, and a Uniform Resource Locator (URL) corresponding to a send button are recorded in the logging database in association with the input response, and wherein an illegal request processing unit determines that the second client request is an illegal request when the one or more additional items do not match corresponding items of information included in the second client request.

9. The system of claim 1, wherein an illegal processing unit performs predetermined processing in response to identifying an illegal request when the identifier extracted from the second client request does not identify the first content and is not found in the logging database, the predetermined processing includes one or more of resending the output response to the client, recording an error, and sending a notification to an operator.

10. The system of claim 1, wherein recording the resulting data in the logging database comprises recording the image.

11. A method implemented by a processor to perform steps comprising:
   receiving an input response at a logging system from a server, the input response related to a first client request and the input response including first content adapted to prompt data input via a client, wherein the first content includes a hypertext markup language (HTML) file;
   determining that the input response includes an object to be logged;
   embedding an identifier of the first content in the input response;
   sending an output response from the logging system to the client, wherein the output response is derived from the input response and the identifier of the first content;
   storing both the HTML file and the identifier of the first content in a logging database in response to determining that the HTML file includes an input form;
   receiving a second client request at the logging system from the client, the second client request corresponding to the output response, the second client request including input data related to the first content and including the identifier of the first content;
   extracting the input data and the identifier of the first content from the second client request;
   retrieving the first content from the logging database based on the extracted identifier of the first content, wherein the extracted identifier of the first content is found in the logging database;
   combining the input data extracted from the second client request with the first content to produce resulting data, wherein the resulting data is produced by modifying the HTML file to include the input data at a predetermined position of the input form;

generating an image of the input form based on the resulting data, the image including the input form and the input data; and recording the resulting data in the logging database.

12. The method of claim 11, wherein the identifier is embedded in a hidden field of the input form.

13. The method of claim 11, wherein the identifier is recorded in the logging database in association with an order in which the identifier was generated with respect to one or more additional identifiers.

14. The method of claim 11, wherein the input data is combined with the first content by embedding the input data as an initial value of an input tag into the input form.

15. The method of claim 11, further comprising determining that the second client request is an illegal request when the identifier extracted from the second client request does not identify the first content and is not found in the logging database.

16. A computer program product to cause a computer to function as a logging system to record a log of an operation, the computer program product comprising:

a computer readable storage device having computer usable program code embedded therewith, the computer usable program code executable by a processor to:

receive an input response from a server, the input response including first content corresponding to a first client request, the first content adapted to prompt data input via a client, wherein the first content includes a hypertext markup language (HTML) file;

embed an identifier in the first content, the identifier to identify the first content; send the client an output response, the output response including at least the first content in which the identifier of the first content is embedded;

store both the HTML file and the identifier of the first content in a logging database in response to determining that the HTML file includes an input form;

receive a second client request from the client, the second client request corresponding to the output response and the second client request including input data related to the first content and the second client request including the identifier of the first content: extract the input data and the identifier of the first content from the second client request;

retrieve the first content from the logging database based on the extracted identifier of the first content, wherein the extracted identifier of the first content is found in the logging database;

combine the extracted input data and the retrieved first content to produce resulting data wherein the resulting data is produced by modifying the HTML file to include the input data at a predetermined position of the input form;

generate an image of the input form based on the resulting data, the image including the input form and the input data; and store the resulting data in the logging database.

17. The computer program product of claim 16, wherein the input response includes additional content.

18. The computer program product of claim 17, wherein the computer usable program code is further executable by the processor to generate the image derived from at least the first content, the input data, and the additional content, wherein the additional content is retrieved from the server, a cache memory at the logging system, or any combination thereof.

19. The computer program product of claim 17, wherein the additional content includes one or more buttons, one or more banners, other static content, or any combination thereof.

20. The program product of claim 16, wherein the computer usable program code is further executable by the processor to determine that the second client request is an illegal request when the identifier extracted from the second client request does not identify the first content and is not found in the logging database.

* * * * *